United States Patent
Chi et al.

(10) Patent No.: US 8,412,782 B2
(45) Date of Patent: Apr. 2, 2013

(54) METHOD AND SYSTEM TO IMPROVE EFFICIENCY OF EMAIL DISCUSSION WITHIN EMAIL CLIENTS

(75) Inventors: Chang Yan Chi, Beijing (CN); Tian Shu Wang, Beijing (CN); Wen Peng Xiao, Heng Yang (CN)

(73) Assignee: International Business Machines Corporation, Armonk, NY (US)

( * ) Notice: Subject to any disclaimer, the term of this patent is extended or adjusted under 35 U.S.C. 154(b) by 648 days.

(21) Appl. No.: 12/032,121

(22) Filed: Feb. 15, 2008

(65) Prior Publication Data

US 2008/0208994 A1 Aug. 28, 2008

(30) Foreign Application Priority Data

Feb. 16, 2007 (CN) .......................... 2007 1 0084945

(51) Int. Cl.
*G06F 15/16* (2006.01)
(52) U.S. Cl. ..................................... 709/206; 379/93.01
(58) Field of Classification Search ................... 709/206
See application file for complete search history.

(56) References Cited

U.S. PATENT DOCUMENTS

| 2003/0177191 | A1 * | 9/2003 | Kawashima et al. | 709/206 |
| 2005/0081159 | A1 * | 4/2005 | Gupta et al. | 715/751 |
| 2005/0234850 | A1 * | 10/2005 | Buchheit et al. | 707/1 |
| 2006/0268875 | A1 * | 11/2006 | Hanner | 370/392 |

FOREIGN PATENT DOCUMENTS

WO WO2005/098701 A2 10/2005

* cited by examiner

*Primary Examiner* — Jude Jean Gilles
*Assistant Examiner* — Jaren M Means
(74) *Attorney, Agent, or Firm* — William Stock; Anne Vachon Dougherty

(57) ABSTRACT

A method and email system for improving efficiency of email discussion within an email client comprising: an email tag filter for filtering a special tag in email contents, extracting original email contents, and identifying tag related information which includes at least an author name corresponding to the email contents; and a content style setting component for receiving and keeping the tag related information fed by the email tag filter, then identifying which part of the email contents is written by which author according to the tag information, and assigning correct style to corresponding contents using a user customization style for each author. The invention differentiates different users mainly by automatically labeling the contents input by the users, and the input contents can be distributed in different positions within a single email, which matches the natural convention of the current users to use the email system.

20 Claims, 3 Drawing Sheets

| WELCOME | REPLICATION X | TIAN SHU WANG-SENT X | RE: PLEASE INPUT X | NEW MEMO X |

| SEND | SEND AND FILE | SAVE AS DRAFT | REPLY TO ALL | DISCUSSION |

X Me    X *CHANG YAN CHI*    X SU HUI    X WEN PENG XIAO — 11

— 12

TIAN SHU WANG/CHINA/IBM      TO: Chang Yan Chi/China/IBM
04/28/2006 04:04PM      CC:
     BCC:
     SUBJECT: Please input My comments are in this style Chang Yan Chi/China/IBM

*Chang Yan says "yes" to order entry by company name.*

Any comments?

No, I do not agree.

The orders should be entered by date.

Any comments?

DATE IS BETTER FOR INVENTORY CONTROL.

FIG. 1

| WELCOME | REPLICATION X | TIAN SHU WANG-SENT X | RE: PLEASE INPUT X | NEW MEMO X |

| SEND | SEND AND FILE | SAVE AS DRAFT | REPLY TO ALL | DISCUSSION —— 11 |

X Me    _CHANG YAN CHI_    X SU HUI    X WEN PENG XIAO —— 12

TIAN SHU WANG/CHINA/IBM  TO: <u>Chang Yan Chi/China/IBM</u>
04/28/2006 04:04PM  CC:
  BCC:
  SUBJECT: Please input My comments are in this style Chang Yan Chi/China/IBM Chang Yan says "yes" to order entry by company name.

Any comments?

No, I do not agree.

The orders should be entered by date.

Any comments?

DATE IS BETTER FOR INVENTORY CONTROL.

FIG. 2

METHOD AND SYSTEM TO IMPROVE EFFICIENCY OF EMAIL DISCUSSION WITHIN EMAIL CLIENTS

TECHNICAL FIELD

The present invention relates to an email system and a method thereof, and in particular, to a method for improving the efficiency of the email discussion within the email clients and email system thereof.

BACKGROUND ART

As the most important communication tool, email is extensively used in the business environment. In many cases, the email is chosen as a discussion tool, in which different users input their own contents and comments to each other. When a user receives an email of a discussion with a long history, it is difficult for him to identify who input what. In general, some users may choose different colors to represent themselves and then to differentiate the contents input by them. But this raises many redundant repetitive operations and it is error prone. On the other hand, when the discussions occur many times, it is difficult to extract the contents input by a specific user even if the contents have different styles. The existing email clients will add a special symbol at the beginning of each line when the user replies to the others' emails. But the symbol may be corrupted by reformatting the email contents. Some advanced email clients, such as Lotus Notes, use extensible format to treat the cited contents in email as a whole element. But when the users want to freely insert their own comments between the cited contents, those comments break the original element structure and the same problem occurs.

An international application of WO2005/098701A2 published on Oct. 20, 2005 and entitled "Displaying Conversations In a Conversation-Based Email System" describes a conversation-based email system which attempts to resolve the problem mentioned above.

This application proposes a complete email system supporting discussions, in which a user can manually tag the email contents to classify and organize. The system provides an effective visual presentation and related search for locating these tags in accordance with discussion threads. The core implemented by this system is a "conversation engine", through which the problem of associating different email contents with discussion threads is resolved. However, this system needs support of a server side such as conversation engines; and the method for resolving the above-mentioned problems is to tag the header of the email, mainly relating to effective presentation of incorporating a plurality of associated emails, which does not match natural convention of the current users to use email systems, thereby bringing some inconvenience to the users of email.

SUMMARY OF THE INVENTION

There are no proper solutions to resolve above-mentioned problems. In view of this, an object of the present invention is to propose a method for improving the efficiency of the email discussion within the email clients and email system thereof, i.e. to propose a novel discussion mode to insert tags in email so as to differentiate contents authored by users with different styles. This method and system can identify the contents authored by different users when the users reply and forward email.

The present invention provides an email system for improving efficiency of email discussion within an email client to achieve the object thereof, said system comprising: an email tag filter for filtering a special tag in email contents, extracting original email contents, and identifying tag related information which includes at least an author name corresponding to the email contents; and a content style setting component for receiving and keeping the tag related information fed by the email tag filter, then identifying which part of the email content is written by which author according to the tag information, and assigning correct style to corresponding contents using a user customization style for each author.

The present invention also provides a method of improving efficiency of email discussion within an email client, comprising: filtering a special tag in email contents, extracting original email contents, and identifying tag related information which includes at least an author name corresponding to the email contents; and keeping the tag related information, then identifying which part of the email contents is written by which author according to the tag information, and assigning correct style to corresponding contents using a user customization style for each author.

When switching to a discussion mode, the method and system of the invention automatically set different styles for the contents authored by different users. Another different style is automatically chosen for the contents written by the user.

Also, the contents authored by different users may be highlighted by open/close the buttons representing the users.

The invention also provides a program product embodied in a computer readable medium comprising computer executable code for performing the above method.

The present invention may assist a user in understanding the context of the email quickly and clearly representing his/her own idea especially when his replies will quote the contents written by other users.

With the method and system of the present invention, the email discussion mode is supported with a lightweight tag labeling method to add the corresponding tags to the related contents of the email directly, so that it can be implemented directly on the email client without the support of server side. The present invention can organize the discussion contents of different users within a single email by embedding the tags directly into the email contents. Furthermore, the invention differentiates different users mainly by automatically labeling the contents input by the users, and the input contents can be distributed in different positions within a single email, which matches the natural convention of the current users to use the email system.

BRIEF DESCRIPTION OF THE DRAWINGS

FIG. 1 shows a basic design user interface of a discussion mode according to an embodiment of the invention.

FIG. 2 shows highlighting the contents written by different users in the user interface of the discussion mode according to an embodiment of the invention shown in FIG. 1.

DETAILED DESCRIPTION OF THE INVENTION

Figure 3:
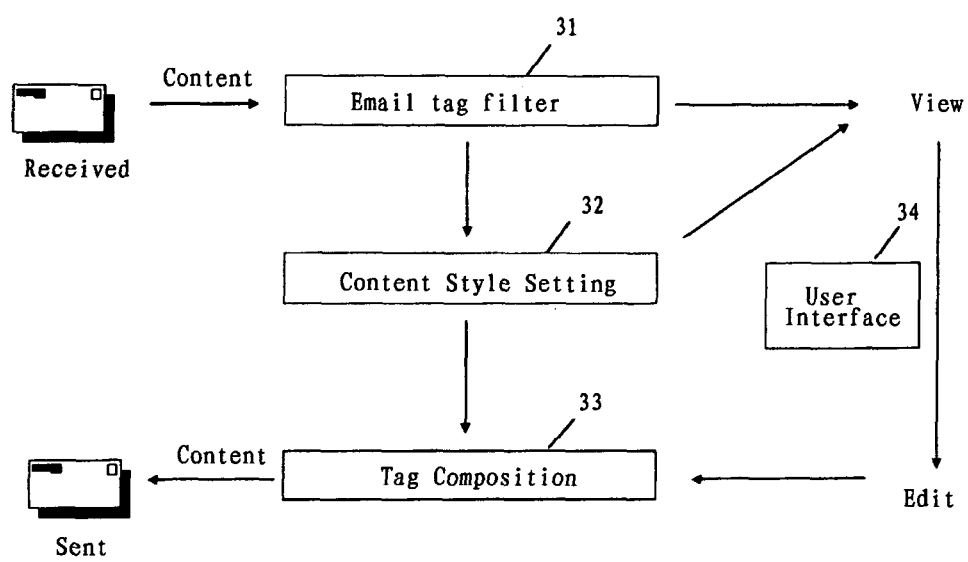
FIG. 3 shows components in a system according to an embodiment of the invention and an operation flow of email discussion mode according to the invention within an email client.

When a user receives an email which is replied and forwarded by many others many times, it is hard to differentiate and find the contents authored by different users in the email. The present inventors design a discussion mode to identify the contents. The basic design thereof is shown in the FIG. 1.

As shown in FIG. 1, there is a button 11 labeled as "discussion", which is used to switch between a normal mode and a discussion mode, on a user interface of email client software. The name of each user who contributed to the email contents (i.e. each user who has written contents in the email) is listed on the "author name bar" 12. For each name, there is a special assigned text style and a checkbox. In the email body, when the discussion mode is active (that is, switch to the discussion mode), the texts input by different users are assigned different text styles (currently the text colors are used) according to the text styles of the corresponding author names, respectively.

A user can switch to the email discussion mode by clicking the discussion button 11. When the discussion mode is active, all the persons who contributed to the email contents, will be detected and then added to the author name bar 12. Each author has an assigned special text style to represent the text contents input by himself. The colors can be used as differentiating style. A user can deactivate the unwanted contents by un-checking the checkbox in front of the author name on the author name bar 12. The contents written by the unchecked authors will be displayed in gray style. And thus he can quickly find and locate the contents that he wants by selecting the person of interest. As shown in FIG. 2, the user un-checks the author name "Chi Chang Yan", and then all the contents input by "Chi Chang Yan" are marked as a gray color, while the contents written by other authors whose names are still checked will remain in the original display so as to be in a highlight status (highlight display) relative to the grey color.

A typical usage scenario to use the discussion mode is:
1. Open an email to be replied to;
2. Switch to discussion mode;
3. Choose the contents by selecting the person of interest;
4. Input the reply contents in proper place.

The present invention can be implemented by a simple architecture on the email client. FIG. 3 gives a schematic view of the implementation architecture of the invention. As shown in FIG. 3, three main components are used to implement the email discussion mode of the invention: Email Tag Filter 31, Content style Setting component 32, and Tag Composition Engine 33. Components in a system according to an embodiment of the present invention and an operation flow within an email client according to the email discussion mode of the present invention will be described with reference to FIG. 3. When a user opens an email in the discussion mode, the Email Tag Filter 31 is used to filter the special tags inside the email contents and identify the tag related information, such as the author name corresponding to the contents. After being processed by the Email Tag Filter 31, the original email contents are extracted and the separated tag related information is fed to the Content Style Setting component 32. The Email Tag Filter 31 can be implemented by a general string matching algorithm using the scripts on email clients, for example, Notes script on Lotus Notes. The detail implementation is based on the chosen tag. For a plain text email, a string pattern searching algorithm can be used, and for the HTML based email, an HTML tag interpreter can be utilized.

The Content Style Setting component 32 receives the tag information which is fed by the Email Tag Filter 31. The Content Style Setting component 32 keeps the tag information to identify which part of the email contents has been written by which user. Also, with the user customization styles for each author, the Content Style Setting component 32 assigns the correct style of the corresponding contents. When the current user inputs new contents or modifies the existing contents, the Content Style Setting component 32 updates the tag information which it keeps accordingly.

The Tag Composition Engine component 33 inserts the tags into the email contents according to the tag information kept by the Content Style Setting component 32. The Tag Composition Engine 33 is executed once only when the users send or save the email. The Tag Composition Engine 33 has a trivial implementation because the Content Style Setting component 32 has kept all position-related information. The Tag Composition Engine 33 just moves to a given position and inserts the corresponding tags.

The implementation described above is a lightweight architecture and all the components can be developed by using the client scripts inside the email client, for example, Note scripts on Lotus Notes, or VB scripts on Microsoft Outlook. With reference to FIG. 3, for example, on Lotus Notes, a Notes script prefilter can be used to implement the Email Tag Filter 31. When opening an email (as shown in FIG. 3, an email received) using a Lotus Notes client, the Lotus Notes client will call the prefilter function. The Email Tag Filter 31 implemented by the prefilter function is used to extract the author tags and the related contents positions from the email contents. Two additional user interface (UI) components 34 are needed: the discussion mode button 11 and the author name bar 12, both of which can be implemented by using Notes script. The Content Style Setting component 31 is invoked by the Email Tag Filter 32 to set the correct text style. For the text input by the current user, keyboard events can be captured and the correct text style can be assigned by using the content style setting component 32, so that the user views the email contents displayed in various styles on the user interface of the email client (herein, the Lotus Notes client). When the user finishes the email editing and clicks the send button, the original sending function is replaced by the Tag Composition Engine component 33. The Tag Composition Engine component 33 translates the texts in various styles into the contents with corresponding tags, and then calls the original sending function. During the whole process, the user is not aware of the existence of any tags and just sees the different styles representing different users. The text styles are automatically chosen by the system of the present invention, either by a random generator or from a pre-defined table in the user preference settings.

With the tag mechanism described above, the method and system of the invention can process the email in HTML and plain text format. The email in these two formats can be supported by most of the email client software and web based email application software. A simple example of the tags which could be used for the email discussion mode of the present invention is given below. It is supposed here that only plain text is used in the email contents.

Using the email discussion mode of the present invention, the [##[Author-Authorname: <contents>]##] can be inserted to label the contents written by the author whose name is Authorname. For example:

[##[Author—Tom: Tom saysyes]##]

[##[Author—Jerry: No I don't agree] ##]

means the email contents are being authored by two authors. The Email Tag Filter 31 searches for all the "[##[" and "]##]" in the email contents, extracts the corresponding contents and feeds the results to the Content style Setting component 32. The Content style Setting component 32 detects that there are two authors in the email and assigns a color for each author. So the user will see Tom says yes (the first line, displayed in blue)

No I Don't agree (the second line, displayed in green).

All the contents input by the user will be automatically tagged. If the user inputs contents containing a special tag "[##[Author" or "]##]", it will be translated into "\[##[author" or "\]##]" to avoid the confusion with the tags used in the present invention.

As compared with the prior art disclosed in the international application WO2005/098701A2, in order to support the email discussion, the present invention adds the corresponding tags to the related contents of the email directly with a lightweight tag labeling method, so that it can be implemented directly in the email client without the support of server side such as the conversation engine which is necessary in the aforementioned international application. To solve the problem brought forward previously, the present invention embeds the tags directly into the email contents and can organize the discussion contents of different users within a single email. Furthermore, the present invention differentiates different users mainly by automatically labeling the input contents of users, and the input contents can be distributed in different positions within a single email, which matches the natural convention of the current users to use the email systems.

The mechanism used in the present invention is also different from the function of tracking changes in MS Word (a word processing software of MicroSoft). MS Word implements the function of tracking changes with its own word processing engine. When a user opens or enables a function for tracking changes, MS Word remembers the changes in a document made by the user, and then saves these changes in this document; so that MS Word can track the changes. The changes are kept in private format and in order to read the private format, it is necessary to install the MS Office application software first. And even with the application software installed, it can not be smoothly integrated with the web-based email application software.

Since the email application software is standard while the MS Word is a private application software, in order to support the discussion mode in the email application software, the present invention may use the email in HTML and plain text format, and use tag filter and tag composition mechanisms to process the email contents.

The invention claimed is:

1. An email client system for improving efficiency of email discussion for a conversation among a plurality of authors within an email client operating at a user computer having at least a processing device, a user input device and a display, said email client system comprising:
    an email tag filter for automatically filtering a special tag in email contents, said special tag being inserted at a tag composition component of an email client, extracting original email contents, and identifying tag related information which includes at least an author name corresponding to the extracted original email contents;
    a content style setting component for automatically receiving the extracted original email contents and tag related information, keeping the tag related information fed by the email tag filter, identifying which part of the extracted original email contents is written by which author according to the tag information, and assigning a style to corresponding extracted original email contents using a user customization style for each author, wherein contents for each of said plurality of authors is assigned a different style; and
    a display generation component for generating and displaying the email discussion in a single generated email for a conversation among a plurality of authors wherein the email discussion is generated in a single email by organizing extracted email contents with a different style for each of said plurality of authors.

2. The email system of claim 1, wherein:
    said email tag filter is implemented by a general string matching algorithm using scripts on the email client.

3. The email system of claim 2, wherein:
    for a plain text email, a string pattern searching algorithm is used to implement said email tag filter; and for a HTML based email, an HTML tag interpreter is utilized to implement said email tag filter.

4. The email system of claim 1, wherein:
    the content style setting component updates the tag information that it keeps when a current author inputs new email contents or modifies email existing contents.

5. The email system of claim 1, further comprising:
    a tag composition engine for inserting the tags into the email contents according to the tag related information kept by the content style setting component.

6. The email system of claim 5, wherein:
    the tag composition engine is executed once only when a user sends or saves the email.

7. The email system of claim 5, wherein:
    an original sending function of the email client is replaced by the tag composition engine, and when a user clicks a send button to send the email, the tag composition engine translates texts in various styles into contents with corresponding tags, and then calls the original sending function of the email client.

8. The email system of claim 1, further comprising two additional user interface components on a user interface of the email client comprising:
    a discussion mode button for switching between a normal mode and a discussion mode wherein the discussion mode comprises display of the generated email discussion with a different style for each of the plurality of authors; and
    an author name bar for listing a name of each author who wrote contents in the email, and automatically assigning to each name a special text style and a check box for selecting and deselecting the corresponding author, wherein in an email body on the user interface of the email client, when switching to the discussion mode, texts input by different authors are automatically assigned different text styles respectively according to the text styles assigned to the corresponding author name.

9. The email system of claim 8, having a highlight function to:
    deactivate unwanted contents based on user deselection of a checkbox in front of the author name on the author name bar while contents written by other authors for whom a checkbox has been selected are still displayed in corresponding text style, so that the contents written by the other authors who are checked are highlighted relatively.

10. A method for an e-mail client system of improving efficiency of email discussion for a conversation among a plurality of authors within an email client, comprising said e-mail client system automatically performing steps of:
    filtering a special tag in email contents, said special tag being inserted at a tag composition component of an email client, extracting original email contents, and identifying tag related information which includes at least an author name corresponding to extracted original email contents;
    keeping the tag related information, identifying which part of the extracted original email contents is written by which author according to the tag information, and assigning correct style to corresponding extracted original contents using a user customization style for each author, wherein extracted original email contents for each of said plurality of authors is assigned a different style; and generating and displaying the email discussion in a single generated email for a conversation among a plurality of authors wherein the email discussion is generated in a single email by organizing extracted original email contents with a different style for each of said plurality of authors.

11. The method of claim 10, wherein:

filtering the special tag in the email contents is implemented by a general string matching algorithm using scripts on the email client.

12. The method of claim 11, wherein:

for a plain text email, a string pattern searching algorithm is used to implement said filtering of the email tag; and for a HTML based email, an HTML tag interpreter is utilized to implement said filtering of the email tag.

13. The method of claim 10, wherein:

the tag information that is kept is updated when a current author inputs new email contents or modifies existing email contents.

14. The method of claim 10, further comprising:

inserting the tags in the email contents according to the tag related information kept.

15. The method of claim 14, wherein:

the inserting the tags in the email contents is executed once only when a user sends or saves the email.

16. The method of claim 15, wherein:

when a user clicks a send button to send the email, texts in various styles are translated into contents with corresponding tags and then an original sending function of the email client is called.

17. The method of claim 10, further comprising implementing two additional user interface components on a user interface of the email client:

a discussion mode button for switching between a normal mode and a discussion mode wherein the discussion mode comprises display of the generated email discussion with a different style for each of the plurality of authors; and an author name bar for listing a name of each author who wrote contents in the email, and automatically assigning to each name a special text style and a check box for selecting and deselecting the corresponding author.

18. The method of claim 17, wherein:

in an email body on the user interface of the email client, when switching to the discussion mode, texts input by different authors are automatically assigned different text styles respectively according to the text styles assigned to the corresponding author name.

19. The method of claim 18, implementing a highlight function to:

deactivate unwanted contents based on user deselection of a checkbox in front of the author name on the author name bar while contents written by other authors for whom checkboxes are selected are still displayed in corresponding text style, so that the contents written by the other authors who are checked are highlighted relatively.

20. A non-transitory program product stored in a computer readable medium comprising computer executable code for automatically performing method steps for improving efficiency of email discussion for a conversation among a plurality of authors within an email client, said method comprising the steps of:

filtering a special tag in email contents, said special tag being inserted at a tag composition component of an email client, extracting original email contents, and identifying tag related information which includes at least an author name corresponding to the email contents;

keeping the tag related information, then identifying which part of the extracted original email contents;

keeping the tag related information, identifying which part of the extracted original email contents is written by which author according to the tag information, and assigning correct style to corresponding extracted original contents using a user customization style for each author, wherein extracted original email contents for each of said plurality of authors is assigned a different style; and generating and displaying the email discussion in a single generated email for a conversation among a plurality of authors wherein the email discussion is generated in a single email by organizing extracted original email contents with a different style for each of said plurality of authors.

* * * * *